Sept. 26, 1939.　　　W. A. DONAHUE　　　2,174,033
CONCEALED HINGE AND REINFORCEMENT
Filed Dec. 27, 1937
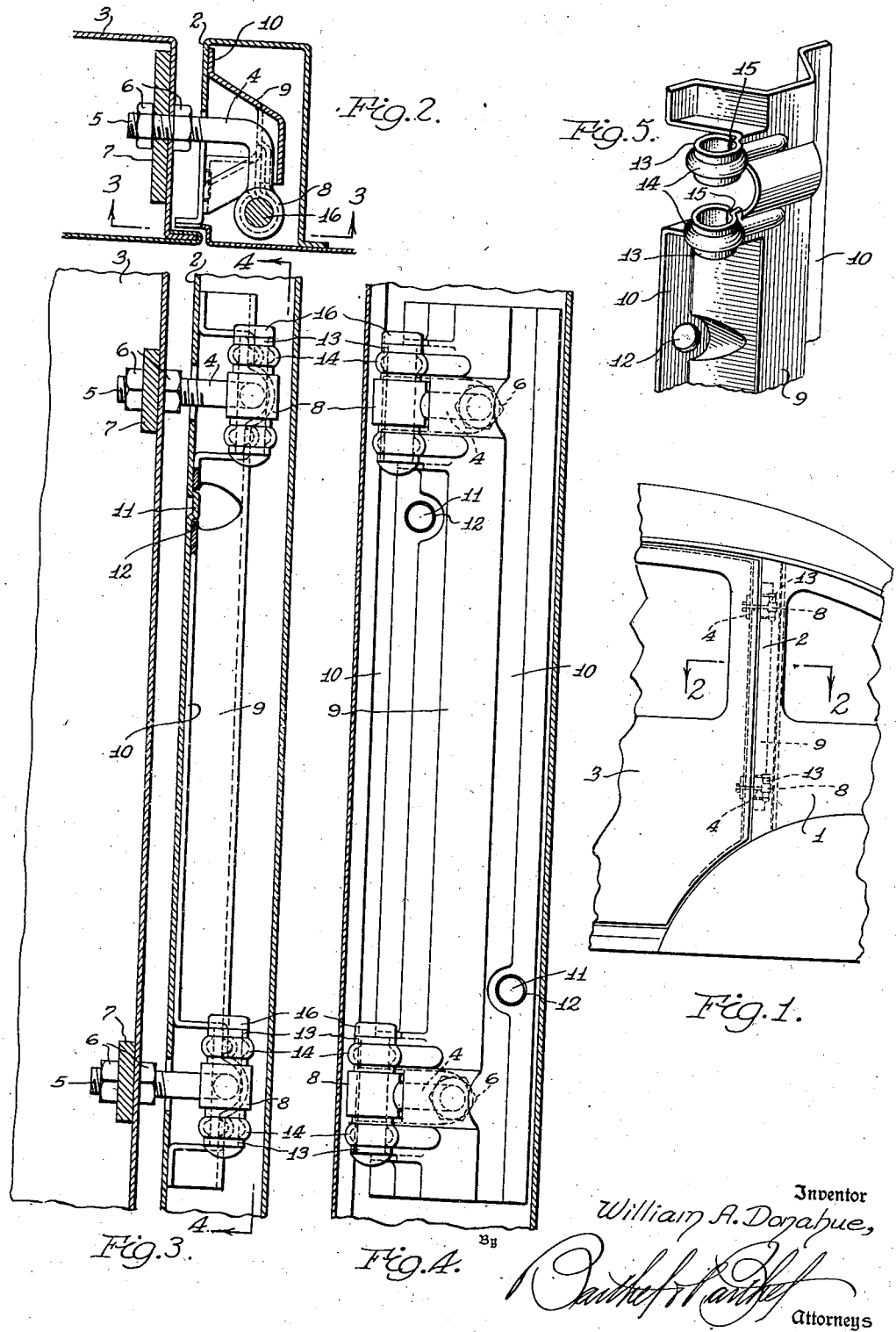
Inventor
William A. Donahue,
Attorneys Patented Sept. 26, 1939

2,174,033

UNITED STATES PATENT OFFICE 2,174,033

CONCEALED HINGE AND REINFORCEMENT

William A. Donahue, Detroit, Mich.

Application December 27, 1937, Serial No. 181,788

2 Claims. (Cl. 16—135)

This invention relates to door hinges and has for its object to provide a concealed hinge adapted particularly for use in conjunction with automobile doors.

An important object of the invention is to provide a hinge of the character above referred to embodying means for reinforcing the pillar structure to render it less susceptible to distortion as a result of the door weight being imposed thereon.

Another object of the invention is to provide a hinge embodying at least a pair of vertically spaced pivots and a pillar reinforcing means which, in addition to reinforcing the pillar, maintains the vertically spaced pivots in a proper position to receive the hinge parts which are connected to the door. In other words, the reinforcement functions as a locating means for the hinge pivots.

Another object of the invention is to provide a door pillar reinforcement adapted to be positioned within a door pillar to extend vertically thereof, the reinforcement having integrally formed means adjacent the top and bottom thereof for receiving a hinge pin member.

With the above and other ends in view, the invention is more fully disclosed with reference to the accompanying drawing, in which—

Figure 1 is a fragmental side elevation of an automobile;

Fig. 2 is a section taken on the line 2—2 of Fig. 1;

Fig. 3 is a section taken on the line 3—3 of Fig. 2;

Fig. 4 is a section taken on the line 4—4 of Fig. 3, and

Fig. 5 is a fragmental perspective view.

Like characters of reference are employed throughout to designate corresponding parts.

The automobile body 1 is formed with a pillar 2, both being composed of sheet metal. The door 3 likewise is formed of sheet metal and has vertically spaced hook arms 4 secured thereto. To provide for attachment of the hook arms to the door each hook arm is provided with a screw-threaded end 5 receiving clamping nuts 6, and the zones where the nuts engage the door wall are reinforced as indicated at 7. The other end of each hook arm is provided with an eye 8, adapted for the reception of a hinge pin.

The pillar 2 is reinforced by a vertically extending channel 9 having laterally extending flanges 10, the flanges being secured, as by welding, to the wall of the pillar. To properly and accurately locate the reinforcing channel, relative to the wall of the pillar, the wall of the pillar is formed with struck-in portions 11 which engage within openings 12 in the lateral flanges 10.

The channel reinforcement 9 is bent adjacent its upper end and its lower end to provide upper and lower pairs of eyes 13, the eye formations being formed integral with the channel and having reinforcing ribs 14 rigidifying the same. The free ends 15 of the eye formations 13 are preferably welded in order that the eyes will not open when subjected to pressure. The pairs of eyes 13 are spaced apart a distance corresponding to the spacing of the hook arms 4, and the upper and lower hook arms extend through apertures in the door pillar and their eyes 8 are received, respectively, between the eyes of the upper and lower pairs of eyes 13. Pivot pins 16 extend through the upper and lower sets of eyes 8—13 and pivotally retain the eyes 8 between respective eyes 13 whereby the hook arms may swing about the axes thereof.

From the foregoing it becomes apparent that the channel reinforcement rigidifies the door pillar to an extent whereby it is capable of supporting the weight of the door, without distortion. The hinge eyes 13, being integral with the channel, are always properly spaced to correspond with the spacing of the hook arms. Inasmuch as the channel is definitely located by the struck-in portions 11, the hinge eyes are located whereby they properly relate the door with respect to the door opening. The hinge eyes 13 are also maintained in co-axial relationship, which obviously is of advantage when the hinge is used in conjunction with door and pillar formations which are curved, as is usually the case.

Although a specific embodiment of the invention has been illustrated and described, it will be understood that various changes may be made within the scope of the appended claims without departing from the spirit of the invention, and such changes are contemplated.

What I claim is:

1. An article of the character described operable for swingably supporting a door relatively to an opening provided therefor in a vehicle body and for being stationarily carried within a hollow pillar provided therefor on the body along one side of the opening, said device comprising an elongated channel member laterally flanged for being secured thereat to the pillar internally of the latter and facing the side of the opening opposite the pillar, a plurality of pairs of annular bearing elements formed integrally with said channel member and extending laterally therefrom in coaxial alignment with each other, said pairs of elements being spaced from each other and each of said elements being formed substantially centrally thereof with an annular embossment extending radially outwardly therefrom, and the elements of each of said pairs being spaced from each other and each of said pairs carrying a coaxially aligned pivot pin about which is operable for being fulcrumed one end of a support which is rigidly mounted at its other end to the door opposite said channel member.

2. An article of the character described operable for swingably supporting a door relatively to an opening provided therefor in a vehicle body and for being stationarily carried within a hollow pillar provided therefor on the body along one side of the opening, said device comprising, an elongated channel member formed at each of its two longer sides with a flange in each of which flanges is provided a locating element for said member predeterminedly positioned in accordance and for cooperation with a locating element provided therefor in the pillar for properly guiding the positioning of said member with respect to the pillar internally of the latter and facing the side of the opening opposite the pillar, a plurality of pairs of annular bearing elements formed integrally with said channel member and extending laterally therefrom in coaxial alignment with each other, said pairs of bearing elements being spaced from each other and each of said bearing elements being formed substantially centrally thereof with an annular embossment extending radially outwardly therefrom, and the bearing elements of each of said pairs being spaced from each other and each of said pairs carrying a coaxially aligned pivot pin about which is operable for being fulcrumed one end of a support which is rigidly mounted at its other end to the door opposite said channel member.

WILLIAM A. DONAHUE.